INVENTOR.
Donald C. Reilly
BY
*Herman E. Smith*
ATTORNEY

United States Patent Office 3,255,858
Patented June 14, 1966

3,255,858
ROLLER CONSTRUCTION
Donald C. Reilly, Downers Grove, Ill., assignor, by mesne assignments, to Westinghouse Air Brake Company, Pittsburgh, Pa., a corporation of Pennsylvania
Filed Oct. 21, 1964, Ser. No. 405,414
4 Claims. (Cl. 193—37)

The present invention relates generally to rollers and more particularly to a roller constructed of dissimilar materials.

It is often necessary to provide rollers, particularly conveyor rollers, a well known example of which is illustrated in U.S. Patent 2,773,257, of corrosion resistant materials. In many cases, corrosion resistant materials lack the strength to stand up under the service imposed or have other undesirable properties such as a tendency to change size or shape with age. It is possible to combine high strength materials such as steel with corrosion resistant materials such as plastics where the operating temperature remains reasonably uniform. However, where such a roller is subjected to a range of temperatures, the difference in thermal expansion of the materials often results in fractures where the materials join each other. For example, a roller subjected to sunlight while turning may reach temperatures in the order of 160 degrees F. and then sink to the ambient temperature at night when it is not operating.

Accordingly, it is an object of the present invention to provide an improved roller constructed of dissimilar materials.

Another object is to provide a metal and plastic joint which has an improved area of contact through a wide range of operating temperatures.

A further object is to provide a double engaging joint having one mode of tight engagement at low temperatures and another mode of tight engagement at high temperatures.

Other objects and advantages will become apparent from the following description together with the drawings.

Figure 1:
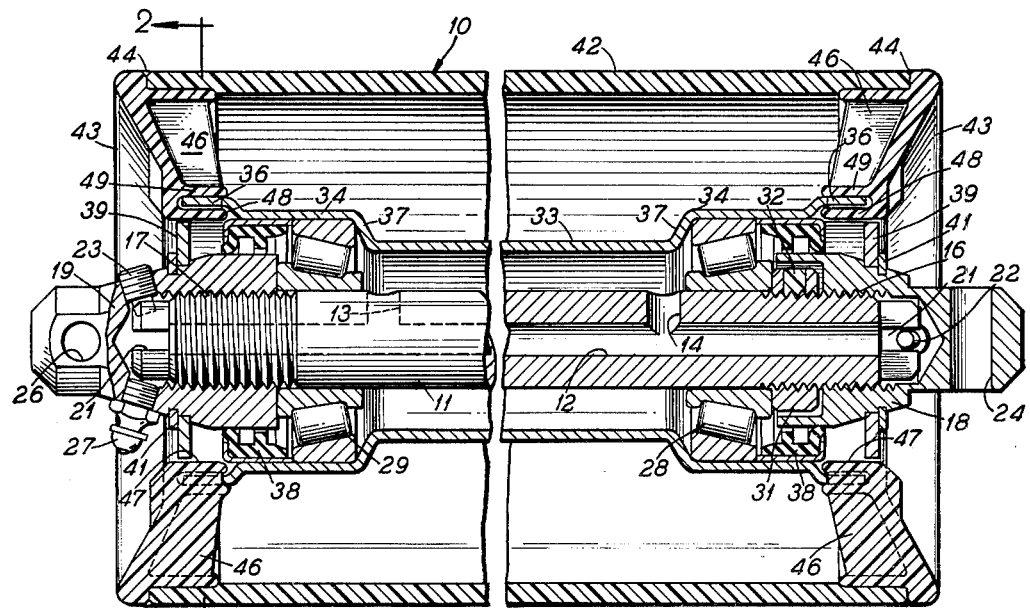
FIGURE 1 is a sectional elevation view of a roller constructed according to the present invention.
Figure 3:
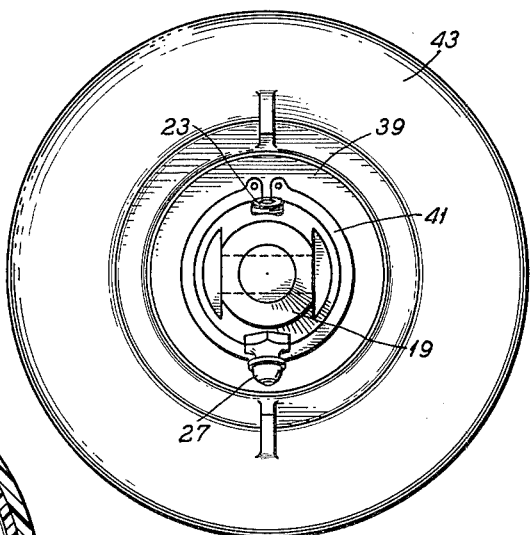
FIG. 3 is an end view of the roller shown in FIG. 1.

Referring now more particularly to the drawings, the numeral 10 refers to the roller assembly of the present invention. A shaft 11 has a passage 12 extending longitudinally through the center to form a lubrication conduit. Spaced ports 13 and 14 are provided for conducting lubricant out of conduit 12. Each end of shaft 11 is threaded as at 16 and 17 to receive end members 18 and 19 at respective ends thereof. Each end of shaft 11 has cross slots 21 which engage the dog of respective set screws 22 and 23. Thus, it is possible to align connector holes 24 and 26 perpendicularly with respect to each other as shown in FIG. 1. A lubrication fitting 27 is shown threaded into end member 19 for supplying lubricant to the passage 12 through slots 21. A pair of bearings 28 and 29 are spaced apart along shaft 11, bearing 29 abutting end member 19 and bearing 28 abutting an adjusting nut 31. A friction plug 32 in adjusting nut 31 engages threaded end 16 to prevent the nut from backing off after bearings 28 and 29 have been adjusted.

A tube 33 surrounds shaft 11 and has a pair of stepped circumferential enlargements 34 and 36 at each end. The inner pair of enlargements 34 provide seats for bearings 28 and 29 which are spaced apart by shoulders 37 in tube 33. Lubricant seals 38 are also seated in enlargements 34 and have a lip sealing against end members 18 and 19. A pair of annular protective rings 39 are secured to end members 18 and 19 by retaining rings 41.

A cylindrical sleeve 42 is concentric with tube 33. This sleeve is preferably made of a corrosion resistant plastic. Each end of sleeve 42 is supported on a respective end disc 43 also made of a corrosion resistant material. As shown in FIG. 1, each end disc 43 has a stepped shoulder around its outer perimeter which abuts an end of sleeve 42 and supports the inner surface thereof. A bevel is formed at the end of the sleeve and on the disc such that when the disc is assembled into the sleeve, a V fillet is formed. A bonding agent 44 is applied to the fillet to secure sleeve 42 and discs 43 together. Braces 46 are formed on the inner side of discs 43 to strengthen the shoulder supporting sleeve 42.

Each disc 43 has a central aperture, defined by the surface 47, large enough to permit installation and removal of bearings 28 or 29 and seals 38. This aperture is closed by protective rings 39 to prevent damage to seals 38. Surface 47 forms the inner surface of an inwardly extending hub formed of inner and outer flanges 48 and 49. Flange 48 is engageable with the inner surface of tube enlargement 36, and flange 49 is engageable with the outside surface of enlargement 36.

Tube 33 and its enlargement 36 are preferably made of steel in order to provide a strong, rigid structural member, while discs 43 are preferably made of corrosion resistant plastic. These dissimilar materials usually have dissimilar thermal expansion properties. Typically, plastic expands more than steel for a given temperature rise. For example, if enlargement 36 were in tight bearing engagement with flange 49, an increase in temperature would result in flange 49 expanding away from enlargement 36 to loosen the engagement. Such thermal expansion would break bonding materials and result in an eccentric fit between flange 49 and enlargement 36. Where the fit is eccentric, the load imposed on sleeve 42 would be transferred to enlargement 36 over an area defined by a small circumferential arc. The small area of contact would result in stress concentration tending to fracture flange 49. Since the roller is normally turning under load, the concentration of stress would be applied to the entire perimeter of flange 49 each revolution.

In order to avoid the stress concentration described above, a second flange 48 is provided for engagement with the inner surface of enlargement 36. As an increase of temperature causes flange 49 to grow away from enlargement 36, flange 48 is growing outwardly toward engagement with enlargement 36. Thus, as the arc of contact between flange 49 and enlargement 36 decreases, the arc of contact between enlargement 36 and flange 48 increases. This results in a sharing of the load by both flanges at intermediate temperatures.

Figure 2:
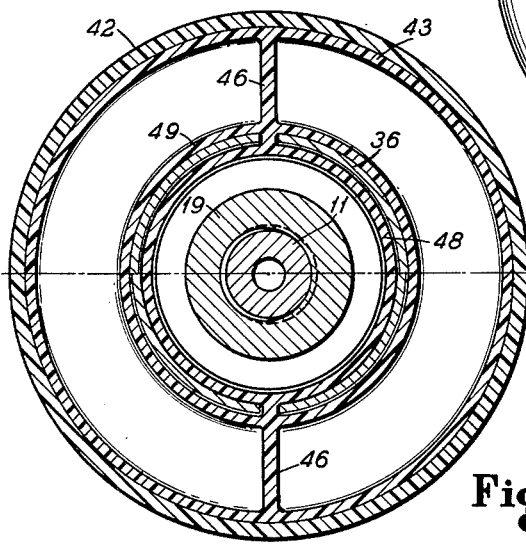
FIG. 2 is an end sectional view taken along the line 2—2 of FIG. 1 looking in the direction of the arrows, illustrating the lower temperature mode of engagement in the upper half of the view and the higher temperature mode of engagement in the lower half of the view.

In the coldest condition, flange 49 assumes the entire load since it is tightly engaged with the outer surface of enlargement 36 as shown in the upper half of FIG. 2. Upon an increase of temperature, the hub of disc 43 grows more rapidly than enlargement 36 with the result that inner flange 48 becomes tightly engaged with the inner surface of enlargement 36 thereby assuming the entire load. As mentioned above, the load is shared by both flanges at intermediate temperatures due to the eccentricity of the fit on the flanges. Thus, a joint is provided in which the load is first assumed by one flange, then gradually transferred to the other flange so that high stress concentrations are avoided.

While I have shown and described a preferred embodiment of my invention, it will be understood that various

What is claimed is:

1. In a roller;
an outer shell, rotatable about a longitudinal axis, adapted to bear against a load in load supporting relationship;
an elongated open end tube extending along and rotatable about said axis disposed concentrically within said shell, said tube adapted to transfer a load to a supporting member; and
a disc, having a coefficient of thermal expansion different from that of said tube, spacing said shell from said tube, said disc having a pair of inwardly extending concentric flanges adapted to engage an end of said tube, the outer surface of said tube bearing against the outer of said flanges under one extreme of temperature and the inner surface of said tube bearing against the inner of said flanges under a different extreme of temperature.

2. In a roller;
an outer shell, rotatable about a longitudinal axis, adapted to bear against a load in load supporting relationship;
an elongated open end tube extending along and rotatable about said axis disposed concentrically within said shell, said tube adapted to transfer a load to a supporting member; and
a disc, having a coefficient of thermal expansion greater than that of said tube, spacing said shell from said tube, said disc having a pair of inwardly extending concentric flanges engaging an end of said tube, the outer surface of said tube bearing against the outer of said flanges under low temperature operating conditions and the inner surface of said tube bearing against the inner of said flanges under high temperature operating conditions.

3. In a roller;
a load supporting corrosion resistant plastic shell, rotatable about a longitudinal axis;
an elongated open end metal tube extending along and rotatable about said axis disposed concentrically within said shell, said tube having bearing seats disposed inwardly of each end thereof; and
a pair of corrosion resistant plastic end discs having a coefficient of thermal expansion greater than that of said tube, each of said discs supporting a respective end of said shell around its perimeter and having a pair of concentric flanges extending inwardly into engagement with a respective end of said tube, the outer surface of said tube bearing against the outer of said flanges under low temperature operating conditions and the inner surface of said tube bearing against the inner of said flanges under high temperature operating conditions.

4. In a roller;
an elongated tube extending along and rotatable about an axis, said tube having a pair of stepped enlargements at each end thereof, the innermost enlargements providing a pair of axially spaced bearing seats;
a pair of axially spaced end discs having a central aperture larger than said bearing seat, each disc having an inwardly projecting hub extending around said aperture including inner and outer concentric annular flanges engaged with the other of said enlargements at a respective end of said tube, the outer of said flanges bearing against the outside surface of the other of said enlargements and the inner of said flanges bearing against the inside surface of the other of said enlargements; and
a cylindrical sleeve concentrically disposed about said axis supported near its ends on said spaced discs.

References Cited by the Examiner

UNITED STATES PATENTS

| 1,709,152 | 4/1929 | Pos et al. | |
| 2,757,988 | 8/1956 | Lecourbe. | |
| 2,886,156 | 5/1959 | Halbron | 193—37 |

FOREIGN PATENTS 699,295  11/1953  Great Britain.

HUGO O. SCHULZ, Primary Examiner.

SAMUEL F. COLEMAN, Examiner.

A. L. LEVINE, Assistant Examiner.